United States Patent
Yu et al.

(10) Patent No.: US 11,920,213 B2
(45) Date of Patent: Mar. 5, 2024

(54) METHOD FOR RECYCLING BATTERY BY INCOMPLETE EXTRACTION

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Ting Peng, Foshan (CN); Yinghao Xie, Foshan (CN); Xuemei Zhang, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/246,671

(22) PCT Filed: Apr. 30, 2021

(86) PCT No.: PCT/CN2021/091611
§ 371 (c)(1),
(2) Date: Mar. 24, 2023

(87) PCT Pub. No.: WO2022/088641
PCT Pub. Date: May 5, 2022

(65) Prior Publication Data
US 2023/0272503 A1 Aug. 31, 2023

(30) Foreign Application Priority Data
Oct. 29, 2020 (CN) .......................... 202011179859.5

(51) Int. Cl.
| | | |
|---|---|---|
| C22B 3/38 | (2006.01) | |
| C22B 1/02 | (2006.01) | |
| C22B 1/24 | (2006.01) | |
| C22B 3/00 | (2006.01) | |
| C22B 7/00 | (2006.01) | |
| C22B 26/12 | (2006.01) | |
| C22B 47/00 | (2006.01) | |
| H01M 10/54 | (2006.01) | |

(52) U.S. Cl.
CPC ............... *C22B 3/3842* (2021.05); *C22B 1/02* (2013.01); *C22B 1/24* (2013.01); *C22B 7/006* (2013.01); *C22B 23/0453* (2013.01); *C22B 26/12* (2013.01); *C22B 47/00* (2013.01); *H01M 10/54* (2013.01)

(58) Field of Classification Search
CPC ........... C22B 3/3842; C22B 1/02; C22B 1/24; C22B 7/006; C22B 23/0453; C22B 26/12; C22B 47/00; C22B 1/08; C22B 3/10; C22B 7/001; C22B 7/005; C22B 1/005; C22B 3/383; H01M 10/54; H01M 4/1391; Y02E 60/10; Y02P 10/20; Y02W 30/84
USPC .......................................................... 75/430
See application file for complete search history.

(56) References Cited

FOREIGN PATENT DOCUMENTS

| | | |
|---|---|---|
| AU | 2020100054 A4 | 2/2020 |
| CN | 103060567 A | 4/2013 |
| CN | 106848470 A * | 6/2017 |
| CN | 106848470 A | 6/2017 |
| CN | 107959080 A | 4/2018 |
| CN | 110616331 A | 12/2019 |
| CN | 111187911 A | 5/2020 |
| CN | 111799524 A | 10/2020 |
| CN | 112342394 A | 2/2021 |
| JP | 2005042189 A | 2/2005 |

OTHER PUBLICATIONS

CN-106848470-A Translation (Year: 2017).*
First Office Action in Chinese Application No. 202011179859.5 dated Mar. 1, 2022.
First Office Action in Indonesia Application No. P00202109331 dated Dec. 30, 2022.
International Search Report and Written Opinion in PCT/CN2021/091611 dated Jul. 20, 2021.
Notification to Grant Patent Right for Invention in Chinese Application No. 202011179859.5 dated Oct. 25, 2022.

* cited by examiner

*Primary Examiner* — Brian D Walck
*Assistant Examiner* — Danielle M. Carda
(74) *Attorney, Agent, or Firm* — Buchalter; Jason W. Croft

(57) ABSTRACT

Disclosed is an incomplete extraction method for recycling batteries, which may include: introducing a pretreatment gas into a device loaded with a waste battery powder, and bringing a gas outlet into communication with absorption liquid A and absorption liquid B in order; raising the temperature and introducing the pretreatment gas; reducing the temperature and introducing a reaction gas; raising the temperature, introducing the reaction gas, and then introducing the pretreatment gas; and reducing the temperature, and turning off the pretreatment gas; adding an extractant to absorption liquid A, mixing the mixture, taking organic phase A, adding a stripping agent, and taking aqueous phase A; and adjusting the pH to acidity, then adding an extractant, taking organic phase B, adding a stripping agent to obtain a stock solution enriched in Li, Mn, Ni and Co.

6 Claims, No Drawings

METHOD FOR RECYCLING BATTERY BY INCOMPLETE EXTRACTION

CROSS-REFERENCE TO RELATED APPLICATION

This application is a national stage filing under 35 U.S.C. § 371 of international application number PCT/CN2021/091611, filed Apr. 30, 2021, which claims priority to Chinese patent application No. 202011179859.5, filed Oct. 29, 2020. The contents of these applications are incorporated herein by reference in their entirety.

TECHNICAL FIELD

The present disclosure relates to the technical field of resource recovery, and more particularly, to a method for recycling a battery by incomplete extraction.

BACKGROUND

Under the vigorous promotion of new energy vehicle policies, the output of new energy vehicles has been increasing year by year and has formed a very large scale. Meanwhile, the amount of scrapped new energy vehicles has also been increasing year by year, and power batteries carried on the scrapped new energy vehicles are a very considerable resource and are currently the focus of recycling. In particular, the recycling value of nickel-cobalt-manganese ternary material batteries is the largest. The four elements, nickel, cobalt, manganese, and lithium, are the main objects recovered from ternary battery materials. Through the development of recycling processes to treat the elements nickel, cobalt, manganese, and lithium in lithium-ion batteries, the element recovery rate is improved, thereby facilitating the directional recycling of resources and energy conservation and emission reduction.

The traditional recovery of the elements nickel, cobalt, and manganese from the positive electrode materials of waste power batteries is done by extraction. However, a solution product separated by the traditional extraction method has a wide variety and high content of impurities; in addition, the recycling process is complicated in operation, high in energy consumption, and relatively high in cost, which is not conducive to the economic and sustainable recycling and processing of waste batteries, and such technologies are relatively backward and have obvious limitations.

SUMMARY

An object of the present disclosure is to provide a method for recycling a battery by incomplete extraction, which differs from a method for recycling batteries by complete extraction in that when using the incomplete extraction recovery method, a chlorination volatilization reaction is carried out prior to using an extraction method to extract the required metal elements Li, Mn, Ni and Co with an extraction rate of 99.86-99.98%.

In order to achieve the above-mentioned object, the following technical solution is used for the present disclosure:

A method for recycling a battery by incomplete extraction, comprising the following steps:
(1) subjecting waste batteries to discharging, crushing, and pyrolysis in order to obtain a waste battery powder;
(2) introducing a pretreatment gas into a device loaded with the waste battery powder, and bringing a gas outlet of the device into communication with absorption liquid A and absorption liquid B in order;
(3) raising the temperature and continuing to introduce the pretreatment gas; reducing the temperature and introducing a reaction gas; raising the temperature, introducing the reaction gas, and then introducing the pretreatment gas; and reducing the temperature, and turning off the pretreatment gas;
(4) adding an extractant to absorption liquid A, mixing the mixture, carrying out liquid separation, taking organic phase A, adding a stripping agent for liquid separation, and taking aqueous phase A; and
(5) adjusting the pH of aqueous phase A to acidity, then adding an extractant for liquid separation, taking organic phase B, adding a stripping agent for liquid separation to obtain a stock solution enriched in Li, Mn, Ni, and Co, wherein the pretreatment gas is at least one of nitrogen, helium, argon or neon; the reaction gas is one of chlorine gas, fluorine gas or bromine gas; absorption liquid A is an acid solution, and absorption liquid B is an alkaline solution.

Preferably, in step (2), the device is a tube furnace.
Preferably, in step (2), the introduced pretreatment gas has a flow rate of 10-30 mL/min and a temperature of 20-40° C.
Preferably, in step (2), the acid solution is HCl. (Using other acids may produce impurities, such as sulfuric acid, which will introduce sulfate radicals)
More preferably, the concentration of absorption liquid A is 0.1-0.3 mol/L.
Preferably, in step (2), the alkaline solution is a NaOH or KOH solution.
More preferably, the concentration of absorption liquid B is 0.5-1 mol/L.
Preferably, the specific operation of step (3) involves: raising the temperature to 300-400° C. at a ramp rate of 3-5° C./min, maintaining the flow rate, continuing to introduce the pretreatment gas for 20-60 min, and maintaining the gas flow rate; reducing the temperature to 20-40° C. and then introducing the reaction gas at a flow rate of 10-50 mL/min; raising the temperature to 200-240° C. at a ramp rate of 3-5° C./min, maintaining the temperature and introducing the reaction gas for 1-3 h; raising the temperature to 280-320° C. at a ramp rate of 3-5° C./min, maintaining the temperature and introducing the reaction gas for 2-3 h; further raising the temperature to 360-380° C. at a ramp rate of 3-5° C./min, maintaining the temperature and introducing the reaction gas for 1-3 h; and finally raising the temperature to 450-470° C. at a ramp rate of 3-5° C./min, maintaining the temperature, introducing the reaction gas for 2-4 h, turning off the reaction gas, introducing the pretreatment gas, and reducing the temperature to 20-35° C.

Preferably, in step (4), the extractant is at least one of [(CH$_3$)$_3$C(CH$_2$)$_5$CH(CH$_3$)CH$_2$]HPO$_2$ (P507) and [CH$_3$(CH$_2$)$_4$CH(CH$_3$)CH$_2$]$_2$HPO$_2$ (P204).
Preferably, in step (4), the stripping agent is at least one of diethylenetriamine pentaacetic acid (DTPA) and triethylenetetramine hexaacetic acid (TTHA).
Preferably, in step (4), the volume ratio of absorption liquid A to the extractant is 1:(1-5).
Preferably, in step (4), the volume ratio of organic phase A to the stripping agent is 1:(1-5).
Preferably, in step (5), the volume ratio of organic phase B to the stripping agent is 1:(1-5).

Preferably, in step (5), the pH of aqueous phase A is adjusted to acidity, wherein a solution of HCl is used, and the adjustment of aqueous phase A to acidity means adjusting the pH to 2.8-6.2.

More preferably, the concentration of the HCl is 0.1-1 mol/L.

Preferably, step (5) further comprises adjusting the pH of the stock solution to acidity, wherein a solution of HCl is used, and the adjustment of the pH of aqueous phase A to acidity means adjusting the pH to 4.2-6.8.

Preferably, step (5) further comprises the concentration and crystallization of the stock solution to obtain a precursor material, which is then sintered into a ternary positive electrode material.

The present disclosure further provides the effect of the above-mentioned method in recycling the metals lithium, nickel, cobalt manganese from waste batteries.

Advantages:
1. The present disclosure differs from a complete extraction method for recycling batteries in that when using the incomplete extraction recovery method, a chlorination volatilization reaction is carried out prior to using an extraction method to extract the required metal elements Li, Mn, Ni, and Co with an extraction rate of 99.86-99.98%.
2. In the present disclosure, by performing waste pretreatment on the waste batteries, a very high separation of recovered elements from non-recovered elements can be achieved, with a separation efficiency of 99.95%.
3. The present disclosure can efficiently recover the elements Li, Mn, Ni, and Co from the battery waste, and the impurity content is controlled to a relatively low level and is merely 0.06%; in addition, it can be reused to prepare a ternary positive electrode material.

DETAILED DESCRIPTION

In order to understand the present disclosure in depth, preferred experimental schemes of the present disclosure will be described below in conjunction with examples to further illustrate the characteristics and advantages of the present disclosure. Any variations or changes that do not deviate from the gist of the present disclosure can be understood by those skilled in the art. The scope of protection of the present disclosure is determined by the scope of the claims.

Embodiment 1

A method for recycling a battery by incomplete extraction was involved, comprising the following specific steps:
(1) subjecting waste batteries to discharge, coarse crushing, pyrolysis and fine crushing in order to obtain a waste battery powder;
(2) placing the waste battery powder in a closed tube furnace, introducing nitrogen with a specification of 99.999% for 10 min at a flow rate of 10 mL/min at 20° C., connecting a gas outlet to tail gas absorption apparatus A in which a 0.1 mol/L HCl solution was placed inside as an absorption liquid, and connecting tail gas absorption apparatus A to tail gas absorption apparatus B in which a 0.5 mol/L NaOH solution was placed inside as an absorption liquid;
(3) raising the temperature to 300° C. at a ramp rate of 5° C./min, maintaining the flow rate, continuing to introduce a pretreatment gas for 20 min, and maintaining the gas flow rate; when the temperature was about to reach 20° C., introducing chlorine gas with a specification of 99.999% at a flow rate of 10 mL/min; raising the temperature to 200° C. at a ramp rate of 5° C./min, maintaining the temperature and introducing chlorine gas for 1 h; raising the temperature to 280° C. at a ramp rate of 5° C./min, maintaining the temperature and introducing chlorine gas for 2 h; raising the temperature to 360° C. at a ramp rate of 5° C./min, maintaining the temperature and introducing chlorine gas for 1 h; finally raising the temperature to 450° C. at a ramp rate of 5° C./min, maintaining the temperature, introducing chlorine gas for 2 h; and after the reaction was completed, turning off the chlorine gas, introducing the pretreatment gas, and reducing the temperature to ambient temperature;
(4) after the temperature dropped to ambient temperature, turning off the pretreatment gas, placing absorption liquid A enriched in Li, Mn, Ni and Co in an extraction apparatus, adding $[(CH_3)_3C(CH_2)_5CH(CH_3)CH_2]HPO_2$ at a volume ratio of 1:1, shaking the mixture for 15 min for liquid separation, adding diethylenetriamine pentaacetic acid (DTPA) to organic phase A at a volume ratio of 1:1, and shaking the mixture for 15 min for liquid separation to obtain aqueous phase A; and
(5) adjusting the pH value of aqueous phase A to 2.8 with 0.1 mol/L HCl, adding $[CH_3(CH_2)_4CH(CH_3)CH_2]_2HPO_2$ at a volume ratio of 1:1, shaking the mixture for 15 min for liquid separation, adding triethylenetetraamine hexaacetic acid (TTHA) to organic phase B at a volume ratio of 1:1, shaking the mixture for 15 min for liquid separation, adjusting the pH value of aqueous phase B to 4.2 with 0.1 mol/L HCl, wherein aqueous phase B was a stock solution enriched in Li, Mn, Ni and Co, concentrating and crystallizing aqueous phase B to obtain a precursor material, and further sintering the precursor material to form a ternary positive electrode material.

Embodiment 2

A method for recycling a battery by incomplete extraction was involved, comprising the following specific steps:
(1) subjecting waste batteries to discharge, coarse crushing, pyrolysis and fine crushing in order to obtain a waste battery powder;
(2) placing the waste battery powder in a closed tube furnace, introducing helium with a specification of 99.999% for 20 min at a flow rate of 20 mL/min at 30° C., connecting a gas outlet to tail gas absorption plant A in which a 0.2 mol/L HCl solution was placed inside as an absorption liquid, and connecting tail gas absorption plant A to tail gas absorption apparatus B in which a 0.7 mol/L KOH solution was placed inside as an absorption liquid;
(3) raising the temperature to 350° C. at a ramp rate of 5° C./min, maintaining the flow rate, continuing to introduce a pretreatment gas for 40 min, and maintaining the gas flow rate; after the temperature was reduced to 30° C., introducing chlorine gas with a specification of 99.999% at a flow rate of 30 mL/min; raising the temperature to 220° C. at a ramp rate of 5° C./min, maintaining the temperature and introducing chlorine gas for 2 h; further raising the temperature to 300° C. at a ramp rate of 5° C./min, maintaining the temperature and introducing chlorine gas for 2.5 h; raising the temperature to 370° C. at a ramp rate of 5° C./min, maintaining the temperature and introducing chlorine gas for 2 h; finally raising the temperature to 460° C. at a ramp rate of 5° C./min, maintaining the temperature, introducing chlorine gas for 3 h; and turning off the chlorine gas, introducing the pretreatment gas, and reducing the temperature to ambient temperature;

(4) after the temperature dropped to ambient temperature, turning off the pretreatment gas, placing absorption liquid A enriched in Li, Mn, Ni and Co in an extraction apparatus, adding $[(CH_3)_3C(CH_2)_5CH(CH_3)CH_2]HPO_2$ at a volume ratio 1:5, shaking the mixture for 15 min for liquid separation, adding diethylenetriamine pentaacetic acid (DTPA) to organic phase A at a volume ratio 1:1, and shaking the mixture for 15 min for liquid separation to obtain aqueous phase A; and (5) adjusting the pH value of aqueous phase A to 2.8 with 0.1 mol/L HCl, adding [CH3(CH2)4CH(CH3)CH2]2HPO2 at a volume ratio of 1:1, shaking the mixture for 15 min for liquid separation, adding triethylenetetraamine hexaacetic acid (TTHA) to organic phase B at a volume ratio of 1:1, shaking the mixture for 15 min for liquid separation, adjusting the pH value of aqueous phase B to 4.2 with 0.1 mol/L HCl, wherein aqueous phase B was a stock solution enriched in Li, Mn, Ni and Co, concentrating and crystallizing aqueous phase B to obtain a precursor material, and further sintering the precursor material to form a ternary positive electrode material.

Embodiment 3

A method for recycling a battery by incomplete extraction was involved, comprising the following specific steps:

(1) subjecting waste batteries to discharge, coarse crushing, pyrolysis and fine crushing in order to obtain a waste battery powder;

(2) placing the waste battery powder in a tube furnace, closing the tube furnace, introducing argon with a specification of 99.999% for 30 min at a flow rate of 30 mL/min at 40° C., connecting a gas outlet to tail gas absorption plant A in which a 0.3 mol/L HCl solution was placed inside as an absorption liquid, and connecting tail gas absorption plant A to tail gas absorption apparatus B in which a 1 mol/L KOH solution was placed inside as an absorption liquid;

(3) raising the temperature to 400° C. at a ramp rate of 5° C./min, maintaining the flow rate, continuing to introduce a pretreatment gas for 60 min, and maintaining the gas flow rate; when the temperature was about to reach 40° C., introducing chlorine gas with a specification of 99.999% at a flow rate of 50 mL/min; raising the temperature to 240° C. at a ramp rate of 5° C./min, maintaining the temperature and introducing chlorine gas for 3 h; then raising the temperature to 320° C. at a ramp rate of 5° C./min, maintaining the temperature and introducing chlorine gas for 3 h; subsequently, raising the temperature to 380° C. at a ramp rate of 5° C./min, maintaining the temperature and introducing chlorine gas for 3 h; finally raising the temperature to 470° C. at a ramp rate of 5° C./min, maintaining the temperature, introducing chlorine gas for 4 h; and turning off the chlorine gas, introducing the pretreatment gas, and reducing the temperature to ambient temperature;

(4) after the temperature dropped to ambient temperature, turning off the pretreatment gas, placing absorption liquid A enriched in Li, Mn, Ni and Co in an extraction apparatus, adding $(CH_3)_3C(CH_2)_5CH(CH_3)CH_2]HPO_2$ at a volume ratio 1:5, shaking the mixture for 25 min for liquid separation, adding diethylenetriamine pentaacetic acid (DTPA) to organic phase A at a volume ratio 1:5, and shaking the mixture for 25 min for liquid separation to obtain aqueous phase A; and (5) adjusting the pH value of aqueous phase A to 2.8 with 0.1 mol/L HCl, adding $[CH_3(CH_2)_4CH(CH_3)CH_2]_2HPO_2$ at a volume ratio of 1:1, shaking the mixture for 15 min for liquid separation, adding triethylenetetraamine hexaacetic acid (TTHA) to organic phase B at a volume ratio of 1:1, shaking the mixture for 15 min for liquid separation, adjusting the pH value of aqueous phase B to 4.2 with 0.1 mol/L HCl, wherein aqueous phase B was a stock solution enriched in Li, Mn, Ni and Co, concentrating and crystallizing aqueous phase B to obtain a precursor material, and further sintering the precursor material to form a ternary positive electrode material.

Comparative Example

A method for recycling batteries was involved, comprising the following steps:

(1) subjecting waste lithium-ion batteries to discharging, crushing, pyrolysis, and crushing to form a battery waste material;

(2) leaching the battery waste material with sulfuric acid, adding copper to remove iron, and adding sodium carbonate to remove iron and aluminum;

(3) performing filtration, extracting the filtrate with P204, back-extracting the organic phase with sulfuric acid, and adding sodium carbonate to precipitate lithium; and (4) extracting nickel from the raffinate with a P507 extractant, wherein the aqueous phase was an Ni solution, and back-extracting the organic phase with hydrochloric acid to obtain a Co solution.

Comparison Results:

Table 1 was the results of the recovery rates of the four elements, lithium, nickel, cobalt and manganese, in the stock solutions obtained in Embodiments 1, 2 and 3 and Comparative Example 1.

TABLE 1

Recovery rates of the four elements, lithium, nickel, cobalt and manganese, in the stock solutions (%)

| Main elements | Embodiment 1 | Embodiment 2 | Embodiment 3 | Comparative Example |
|---|---|---|---|---|
| Li amount | 99.87 | 99.93 | 99.89 | 89.83 |
| Ni amount | 99.91 | 99.95 | 99.92 | 89.74 |
| Co amount | 99.85 | 99.98 | 99.94 | 89.64 |
| Mn amount | 99.90 | 99.91 | 99.88 | 89.34 |

It can be seen from Table 1 that the recovery rates of the four elements, lithium, nickel, cobalt and manganese, in Embodiments 1-3 were all higher than those of the comparative example, and Embodiment 2 had the best recovery effects.

Table 2 was the results of the concentrations of impurity elements as measured by ICP-OES for the stock solutions obtained in Embodiments 1, 2 and 3 and Comparative Example 1.

TABLE 2

| Content of impurities in stock solution (%) | | | | |
|---|---|---|---|---|
| Impurity element | Embodiment 1 | Embodiment 2 | Embodiment 3 | Comparative Example |
| Fe | 0.0008 | 0.0005 | 0.0006 | 0.05 |
| Al | 0.006 | 0.001 | 0.007 | 0.01 |
| Cu | 0.001 | 0.0008 | 0.001 | 0.004 |
| Zn | 0.0009 | 0.0007 | 0.0008 | 0.008 |
| Pb | 0.0009 | 0.0007 | 0.0008 | 0.0008 |
| Cd | 0.0003 | 0.0002 | 0.0003 | 0.006 |
| K | 0.009 | 0.008 | 0.008 | 0.008 |
| Na | 0.004 | 0.003 | 0.003 | 0.09 |
| Ca | 0.008 | 0.005 | 0.006 | 0.03 |
| Mg | 0.005 | 0.003 | 0.004 | 0.03 |
| Insolubles | 0.007 | 0.003 | 0.005 | 0.01 |

It can be seen from Table 2 that the contents of impurities in the stock solutions of Embodiments 1-3 are significantly lower than the contents of impurities in the stock solution of Comparative Example 1 obtained by the extraction method, indicating that the use of the incomplete extraction method for recycling batteries of the present disclosure results in better metal recovery effects.

Table 3 is the energy consumptions, water amounts and extractant amounts for 1 ton of the stock solutions obtained in Embodiments 1, 2 and 3 and Comparative Example 1 with the same concentration.

TABLE 3

| Resource consumption for producing 1 ton of stock solution | | | | |
|---|---|---|---|---|
| Impurity | Embodiment 1 | Embodiment 2 | Embodiment 3 | Comparative Example |
| Energy consumption/kWh | 14 | 18 | 24 | 43 |
| Water amount/t | 1.2 | 1.3 | 1.3 | 1.6 |
| Total extractant amount/t | 2 | 5 | 8 | 13 |

It can be seen from Table 3 that the energy consumptions and extractant amounts of Embodiments 1, 2 and 3 are significantly lower than those of Comparative Example 1 which uses the extraction method, and therefore, the use of the incomplete extraction method for recycling batteries of the present disclosure in metal recovery results in a low cost and a high profit.

The above-mentioned embodiments are preferred embodiments of the present disclosure; however, the embodiments of the present disclosure are not limited by the above-mentioned embodiments. Any other changes, modifications, and simplifications made without departing from the spirit and principle of the present disclosure should be equivalent replacement modes, and are all included in the scope of protection of the present disclosure.

The invention claimed is:

1. A method for recycling a battery by incomplete extraction, characterized by comprising:
   (1) subjecting waste batteries to discharging, crushing, and pyrolysis to obtain a waste battery powder;
   (2) introducing a pretreatment gas into a device loaded with the waste battery powder, and bringing a gas outlet of the device into communication with absorption liquid A and absorption liquid B in order;
   (3) performing the following operations on the device loaded with the waste battery powder: raising the temperature and continuing to introduce the pretreatment gas; reducing the temperature and introducing a reaction gas; raising the temperature, introducing the reaction gas, and then introducing the pretreatment gas; and reducing the temperature, and turning off the pretreatment gas;
   (4) adding a first extractant to absorption liquid A, mixing the mixture, carrying out liquid separation, taking organic phase A, adding a first stripping agent for liquid separation, and taking aqueous phase A; and
   (5) adjusting the pH of aqueous phase A to acidity, then adding a second extractant for liquid separation, taking organic phase B, adding a second stripping agent for liquid separation to obtain a stock solution enriched in Li, Mn, Ni and Co;
   wherein the pretreatment gas is at least one of nitrogen, helium, argon or neon; the reaction gas is one of chlorine gas, fluorine gas or bromine gas; absorption liquid A is an acid solution, the acid solution is HCl; and absorption liquid B is an alkaline solution, the alkaline solution is a NaOH or KOH solution; wherein, in step (4), the first extractant is $[(CH_3)_3C(CH_2)_5CH(CH_3)CH_2]HPO_2$ and the first stripping agent is diethylenetriamine pentaacetic acid; in step (5), the second extractant is $[CH_3(CH_2)_4CH(CH_3)CH_2]_2HPO_2$ and the second stripping agent is triethylenetetraamine hexaacetic acid.

2. The method of claim 1, wherein, in step (2), the introduced pretreatment gas has a flow rate of 10-30 mL/min and a temperature of 20-40° C.

3. The method of claim 1, wherein, the specific operation of step (3) involves: raising the temperature to 300-400° C. at a ramp rate of 3-5° C./min, maintaining the flow rate, continuing to introduce the pretreatment gas for 20-60 min, and maintaining the gas flow rate; reducing the temperature to 20-40° C. and then introducing the reaction gas at a flow rate of 10-50 mL/min; raising the temperature to 200-240° C. at a ramp rate of 3-5° C./min, maintaining the temperature and introducing the reaction gas for 1-3 h; raising the temperature to 280-320° C. at a ramp rate of 3-5° C./min, maintaining the temperature and introducing the reaction gas for 2-3 h; further raising the temperature to 360-380° C. at a ramp rate of 3-5° C./min, maintaining the temperature and introducing the reaction gas for 1-3 h; and finally raising the temperature to 450-470° C. at a ramp rate of 3-5° C./min, maintaining the temperature, introducing the reaction gas for 2-4 h, turning off the reaction gas, introducing the pretreatment gas, and reducing the temperature to 20-35° C.

4. The method of claim 1, wherein, in step (4), the volume ratio of absorption liquid A to the first extractant is 1:(1-5); and in step (4), the volume ratio of organic phase A to the first stripping agent is 1:(1-5).

5. The method of claim 1, wherein, in step (5), the volume ratio of organic phase B to the second stripping agent is 1:(1-5).

6. Use of the method of claim 1 in metal recovery.

* * * * *